Figure 1:
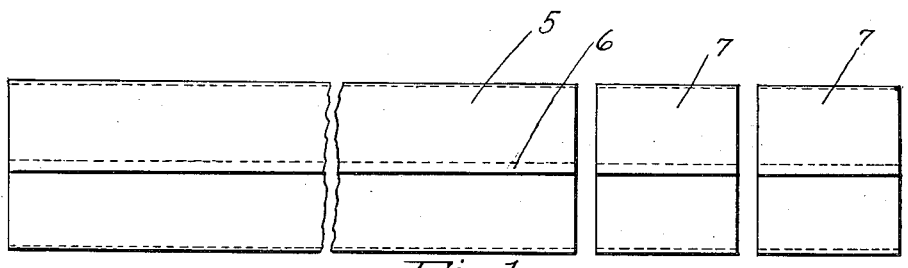

Oct. 12, 1943.   G. D. MALLORY   2,331,794
PRODUCTION OF TAMPERPROOF SEALS
Filed Dec. 27, 1941

Inventor
Gerald D. Mallory

By
Attorney

Patented Oct. 12, 1943

2,331,794

UNITED STATES PATENT OFFICE 2,331,794

PRODUCTION OF TAMPERPROOF SEALS

Gerald D. Mallory, Akron, Ohio, assignor to Wingfoot Corporation, Akron, Ohio, a corporation of Delaware Application December 27, 1941, Serial No. 424,676

3 Claims. (Cl. 18—56)

This invention relates to the production of tamperproof seals. There is a great variety of such seals on the market. The invention relates to the production of seals which are shrunk onto bottles, etc., by heating.

The formation and application of such seals is described in Abrams et al. U. S. Patent #2,223,017. This refers to the production of such seals from rubber hydrochloride film, such as that described in Calvert U. S. Patent #1,989,632. It describes the formation of such seals from a tape of rubber hydrochloride film. The process of the invention differs from the process of manufacture described in the Abrams et al. patent in that the seals of the present invention are produced from stretched rubber hydrochloride film and, therefore, shrink to a greater extent than the Abrams et al. seals when applied to a container. Furthermore, according to the process of production of the present invention, the seals are not made from a tape of rubber hydrochloride film but from a sheet which is formed into a tube which is then cut to length. Although the invention is described more particularly as applied to the use of rubber hydrochloride film, such as Pliofilm, other thermostretchable films may be used.

Rubber hydrochloride film is formed by casting a cement or dispersion of rubber hydrochloride in a solvent, such as benzene and then evaporating the solvent. Films .001 of an inch thick to .0015 of an inch thick or somewhat thicker are readily produced in this manner. Thicker films, such as films .002 of an inch thick and thicker are preferably made by the lamination of two or more thinner films, because the evaporation of solvent on a thick cast film is so small as to be uneconomical for a commercial operation.

The seals of this invention are made from a thick sheet formed by plying up two or more films about .001 of an inch thick. These thin films are united by heat and pressure. As many as four or five plies about .001 of an inch thick may be united for this purpose. Usually the sheet formed by the union of three such plies will be used. The film employed may be an elastocized rubber hydrochloride film, but for most purposes an unelastocized film will be found satisfactory, although a film containing a small amount of elastocizer, such as 2.5% of butyl stearate gives good results. A highly elastocized film is too readily stretched to be satisfactory for use as a tamperproof seal.

A long, wide sheet formed by plying up with heat and pressure three plies of rubber hydrochloride film, each about .0017 of an in thick and containing no more than a small amount of elastocizer gives a continuous sheet from which the seals may advantageously be formed.

This sheet is stretched widthwise; it is first heated to a temperature between about 170 and 190° F. or up to perhaps 215° F. by passing under a plate heated to 450° F. and then gripped at the edges and stretched laterally while maintained in a heated condition by the proximity of steam coils. The sheet is then cooled under tension and is preferably rapidly brought to substantially room temperature to maintain a high degree of stretch in the film. If not cooled under tension, the film will contract to its original unstretched dimensions on cooling.

This film is then cut into tapes somewhat wider than the circumference of the seals which are to be formed. The tapes are then rolled to form a tube, and the edges are overlapped a slight amount. The overlapped edges are united with an adhesive or a solvent such as chloroform or benzene, the union being made with pressure, preferably with heat also.

These tubes which may, for example, be as small as a half inch in diameter or less, up to an inch or two inches in diameter or more, are then cut to length. This may be done at a very high rate of speed in any suitable cutting device. Each length, for example, may be but one-fourth of an inch high or even less or may be as high as an inch or an inch and one-half, or more. Each such length forms a separate seal. As it is fitted around the neck and closure of a bottle or other similar container and heated, it will shrink to conform to the shape of the neck and closure. The only practical way to remove such a seal is to destroy it. Any attempt to remove it intact and then replace it after tampering with the contents of the bottle or other container will be readily discerned by even an untrained eye.

If desired, tubes may be formed by splicing sheets of clear and pigmented film, and forming a tube from the spliced sheet. This will be cut in short tubes each of which has a window which may be placed over any revenue stamp on the bottle.

Figures 2, 3:
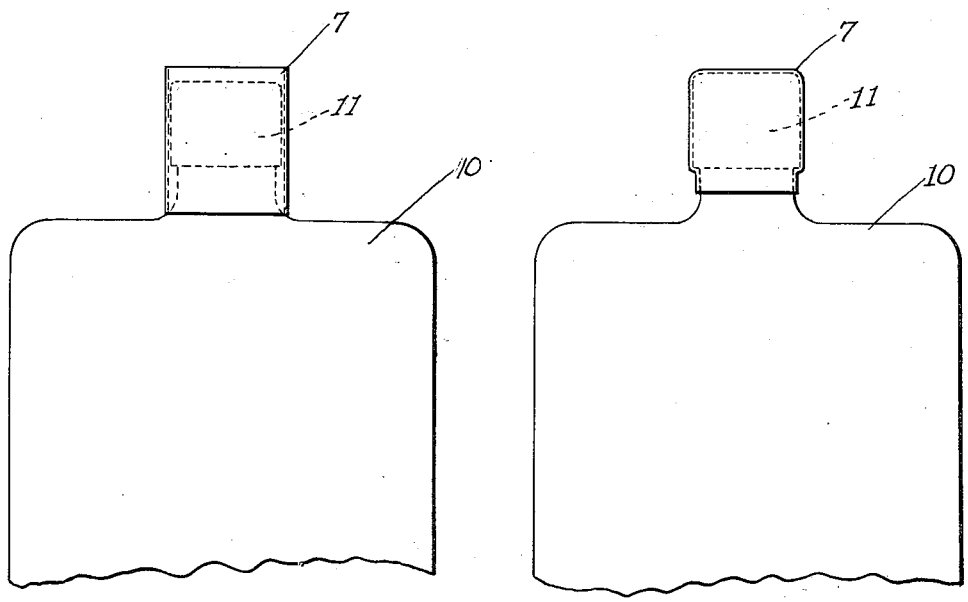

The invention will be further illustrated in connection with the accompanying drawing, in which Fig. 1 shows the tube cut into sections, and Figs. 2 and 3 are side views showing the application of a seal to a bottle. Fig. 1 shows the tube 5 which is formed by overlapping the edges of a single ply of the film, as indicated at 6. At the right-hand end of the tube are sections 7, 7 which have been cut from the tube and are the finished seals.

Fig. 2 shows the bottle 10 which is closed by the screw cap 11. Any suitable closure may be used instead of a screw cap. The seal 7, just as it is cut from the long tube 5 of Fig. 1, is placed over the screw cap. It is somewhat wider than the screw cap. It is not much larger in diameter. On heating the tube shrinks. On heating to a temperature somewhat above the boiling point of water, for example, a temperature of 230° F., the film will practically immediately tend to shrink to its unstretched dimensions. The presence of the screw cap prevents the film from shrinking to this extent. It is, therefore, unnecessary to heat it to this high temperature. The temperature to which it is to be heated will depend upon the temperature at which the film has been stretched and the amount which the film must shrink to fit snugly over the screw cap. Generally the tube will be heated to a temperature of about 200° F. to cause it to shrink on to the closure.

On heating the seal or tube shrinks and fits tightly over the screw cap as shown in Fig. 3. It not only covers the screw cap, but in the example shown in the drawing, it fits around the neck of the bottle so that the screw cap cannot be turned without distorting or breaking the seal. This type of tube also forms a tamperproof seal when used on a bottle closed with a cork or other closure.

The drawing is illustrative and is not intended to limit the scope of the invention. Various designs of bottles and caps may be employed.

What I claim is:

1. The method of forming tamperproof seals which comprises heating a sheet of thermostretchable film and stretching it laterally to produce a grain throughout the thickness of the sheet which extends laterally therein, cutting the sheet longitudinally into a plurality of tapes, forming each tape into a tube with said grain running circumferentially in the wall thereof, and then cutting the tubes into lengths, each of which constitutes a tamperproof seal.

2. The method of forming tamperproof seals which comprises uniting a plurality of plies of thermostretchable film, heating the resulting sheet and stretching it laterally to produce a grain throughout the thickness of the sheet which extends laterally therein, cutting the sheet longitudinally into a plurality of tapes, forming each tape into a tube with said grain running circumferentially in the wall thereof, and then cutting the tubes into lengths, each of which constitutes a tamperproof seal.

3. The method of forming tamperproof seals from cast rubber hydrochloride film about .001 of an inch thick which comprises uniting three long sheets of such film by heat and pressure, stretching the sheet laterally to produce a grain throughout the thickness of the sheet which extends laterally therein, then cutting the sheet longitudinally into a plurality of tapes, thereafter uniting the edges of individual tapes to form a tube from each tape with said grain extending circumferentially in the wall thereof, and then cutting each tube into lengths, each of which constitutes a tamperproof seal.

GERALD D. MALLORY.